(12) United States Patent
Keibler

(10) Patent No.: US 7,454,861 B1
(45) Date of Patent: Nov. 25, 2008

(54) FISHING LINE RELEASE AND BITE ALARM APPARATUS

(76) Inventor: Howard M. Keibler, 357 Loyalhanna Dam Rd., Saltsburg, PA (US) 15681

( * ) Notice: Subject to any disclaimer, the term of this patent is extended or adjusted under 35 U.S.C. 154(b) by 324 days.

(21) Appl. No.: 11/400,966

(22) Filed: Apr. 10, 2006

(51) Int. Cl.
*A01K 97/12* (2006.01)
(52) U.S. Cl. ......................................................... 43/17
(58) Field of Classification Search ....................... 43/17
See application file for complete search history.

(56) References Cited

U.S. PATENT DOCUMENTS

| | | | | |
|---|---|---|---|---|
| 522,352 A * | 7/1894 | Poppowitsch | ................... | 43/17 |
| 1,705,419 A * | 3/1929 | Rossi | .............................. | 43/17 |
| 1,737,921 A * | 12/1929 | Derr | ............................... | 43/17 |
| 2,556,628 A * | 6/1951 | Nisle, Sr. | ........................ | 43/17 |
| 2,574,333 A * | 11/1951 | Kuczynski et al. | ............. | 43/17 |
| 2,663,110 A * | 12/1953 | Guzy | ............................. | 43/17 |
| 2,680,842 A * | 6/1954 | Opphile | .......................... | 43/17 |
| 2,722,076 A * | 11/1955 | Nello | ............................. | 43/17 |
| 2,774,168 A * | 12/1956 | Chute | ............................ | 43/17 |
| 2,869,275 A * | 1/1959 | Levin | ............................ | 43/17 |
| 2,922,243 A * | 1/1960 | Weaver et al. | .................. | 43/17 |
| 2,978,828 A * | 4/1961 | Taylor et al. | .................... | 43/17 |
| 3,024,561 A * | 3/1962 | Wyatt | ............................. | 43/17 |
| 3,091,881 A * | 6/1963 | Evans | ............................. | 43/17 |
| 3,280,496 A * | 10/1966 | London | .......................... | 43/17 |
| 3,599,368 A * | 8/1971 | Riley | ............................. | 43/17 |
| 3,680,244 A * | 8/1972 | Cala | .............................. | 43/17 |
| 3,711,847 A * | 1/1973 | Barrows | ......................... | 43/17 |
| 3,913,255 A * | 10/1975 | Fillmen | .......................... | 43/17 |
| 3,959,910 A * | 6/1976 | Montgomery | ................... | 43/17 |
| 4,209,930 A * | 7/1980 | Boynton | ......................... | 43/17 |
| 4,235,036 A * | 11/1980 | Dawson | .......................... | 43/17 |
| 4,250,649 A * | 2/1981 | Harrington et al. | ............. | 43/17 |
| 4,398,185 A * | 8/1983 | Roberts, Sr. | .................... | 43/17 |
| 4,471,555 A * | 9/1984 | Soukup | .......................... | 43/17 |
| 4,586,284 A * | 5/1986 | Westwood, III | ................ | 43/17 |
| 4,660,316 A * | 4/1987 | Gamelin | ......................... | 43/17 |
| 4,693,125 A * | 9/1987 | Krutz et al. | .................... | 43/17 |
| 4,727,673 A * | 3/1988 | Dumar | ........................... | 43/17 |
| 4,905,398 A * | 3/1990 | Botbyl | ........................... | 43/17 |
| 5,129,174 A * | 7/1992 | Wilson | ........................... | 43/17 |
| 5,261,180 A * | 11/1993 | Foster et al. | ................... | 43/17 |
| 5,396,726 A * | 3/1995 | Zepeda, Sr. | .................... | 43/17 |
| 5,495,688 A * | 3/1996 | Sondej et al. | .................. | 43/17 |
| 5,501,027 A * | 3/1996 | Acker | ............................. | 43/17 |
| 5,867,931 A * | 2/1999 | Morris et al. | ................... | 43/17 |

(Continued)

FOREIGN PATENT DOCUMENTS

DE 3839167 A1 * 11/1989

(Continued)

*Primary Examiner*—Darren W Ark
(74) *Attorney, Agent, or Firm*—R. S. Lombard

(57) ABSTRACT

In a two-way pre-bite tension adjustment and fishing line release and fish bite alarm apparatus including a non-electrically conductive body housing a battery and an electrically energized auditory-visual alarm. A two-way pre-bite fishing line tensioning mechanism utilizing a frictional tensioning screw together with the leverage gained by a thin elongated flat rotatable truncated U-shaped tensioning lever-alarm activation member to control an electrical switch member to release the fishing line and emit an auditory-visual signal upon a fish taking bait attached to the fishing line.

24 Claims, 7 Drawing Sheets

U.S. PATENT DOCUMENTS

| | | | | |
|---|---|---|---|---|
| 5,894,691 A | * | 4/1999 | Zepeda, Sr. | 43/17 |
| 5,970,645 A | * | 10/1999 | Thill | 43/17 |
| 6,293,043 B1 | * | 9/2001 | Zwettler | 43/17 |
| 6,708,441 B2 | * | 3/2004 | Dirito | 43/17 |
| 6,935,068 B2 | * | 8/2005 | Shackelford | 43/17 |
| 6,938,367 B2 | * | 9/2005 | Cameron et al. | 43/17 |
| 6,966,140 B1 | * | 11/2005 | Rozkowski | 43/17 |
| 7,183,931 B1 | * | 2/2007 | Russell | 43/17 |
| 2003/0097779 A1 | * | 5/2003 | Shackelford | 43/17 |
| 2006/0218843 A1 | * | 10/2006 | Sanchez et al. | 43/17 |

FOREIGN PATENT DOCUMENTS

| | | | | |
|---|---|---|---|---|
| EP | 897663 A1 | * | 2/1999 | |
| FR | 2738714 A1 | * | 3/1997 | |
| GB | 2080081 A | * | 2/1982 | |
| GB | 2284332 A | * | 6/1995 | |
| GB | 2307161 A | * | 5/1997 | |
| JP | 10201407 A | * | 8/1998 | |
| JP | 2002315491 A | * | 10/2002 | |
| JP | 2003230346 A | * | 8/2003 | |
| JP | 2004166528 A | * | 6/2004 | |

* cited by examiner

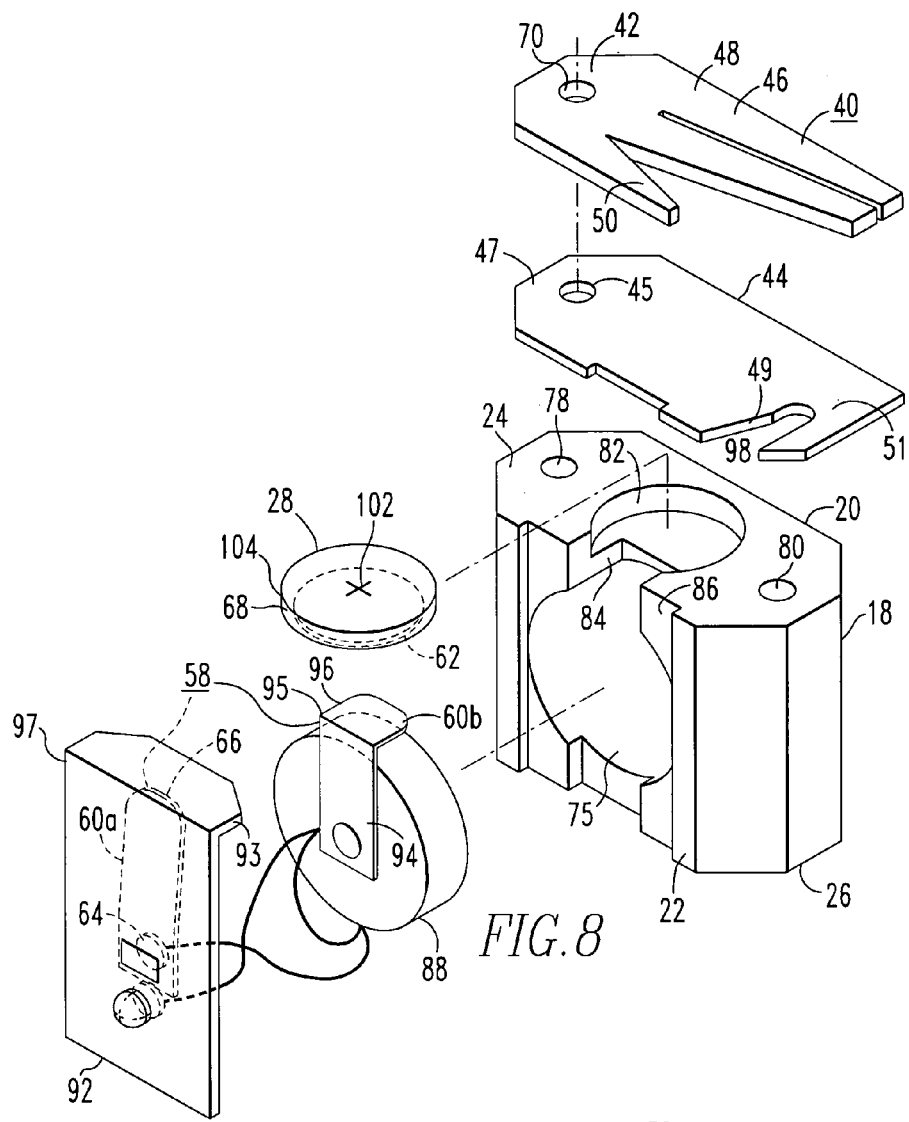
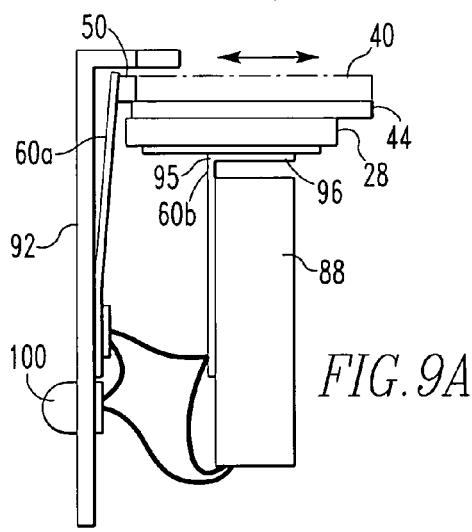
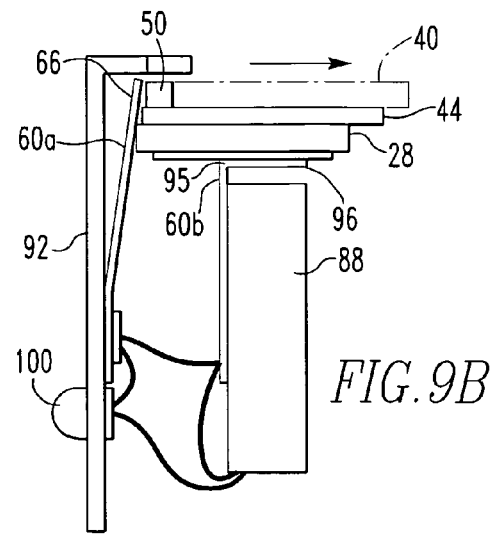

FISHING LINE RELEASE AND BITE ALARM APPARATUS

BACKGROUND OF THE INVENTION

This invention relates to a fishing line release and fish bite alarm apparatus, in particular, to an apparatus for detecting a fish biting a lure or bait attached to the fishing line and exerting sufficient tension on the line to release it and activating an alarm for alerting the fisherman. Various such apparatus have been disclosed in the past.

One such fish bite alarm and fishing line release device is disclosed in U.S. Patent Application Publication No.: US 2003/0097779 A1, dated May 29, 2003, by Robert Shackelford. The Shackelford device discloses a line holding and release device preferably including two fingers arranged for holding the line. A spring bias arrangement with a tension adjusting knob for triggering the release of the line and activating an alarm circuit is disclosed. The spring arrangement is mechanically connected to the fingers to cause a release of the line upon a fish striking.

Another example of such an apparatus is disclosed in U.S. Pat. No. 5,894,691, issued Apr. 20, 1999, to Lawrence Zepeda, Sr. The Zepeda device utilizes a fish bite indicator in combination with a fishing rod and reel to provide an audible and/or visual signal when the fishing line is under a sufficient state of tension. The fishing line is threaded through a loop at one end of the oscillating arm below the rod in such a way to cause the arm to move upward toward the rod when the line has sufficient tension to indicate a fish strike. The other end of the arm is configured to activate the audible and/or visual signal.

In U.S. Pat. No. 5,867,931 issued Feb. 9, 1999, to Brain G. Morris et al, is disclosed a self-contained, battery operated fishing line tension detector and alarm system that adapts to a conventional fishing rod, reel and line assembly. The system detects the feeding activity or strike of a fish by detected the related change in the tension of the line. Engagement and disengagement of the line takes place without the person having to handle the line.

A fish bite signal apparatus is disclosed in U.S. Pat. No. 5,261,180 issued Nov. 16, 1993, to Brian Foster et al. The Foster patent discloses a fishing rod/line signaling device for attachment to a rod near the handle. The device receives the fishing line is a way that an audible and/or visual alarm will be activated when a fish strikes. A pair of spring biased elements are adapted to receive the fishing line there between and permit the fishing line to be pulled out there from.

Another such device is disclosed in U.S. Pat. No. 4,398,185 issued Aug. 9, 1983, to Joseph M. Roberts, Sr. The Roberts device discloses a fishing alarm, including a battery, alarm, electrical interconnect, and switch actuator mounted within a housing. The switch uses a planar member with two conductive layers on one major surface. A rotatable pin extends through the planar member with a wiper blade fastened to one end of the pin in contact with one conductive layer and rotatable into contact with the other conductive layer. A lever is attached to the other end of the pin and extends through the housing. A fishing line engages the lever and the pull on the line rotates the pin and wiper blade to actuate the alarm. A manually operable screw engages the pin or planar member to establish drag on the switch.

The prior art devices described thus far are relatively complex, and are somewhat constrained as to the degree of allowed adjustment of the tension on the fishing line while at the same time maintaining the reliability of the functioning of the device upon a fish striking the line in virtually any weather condition.

SUMMARY OF THE INVENTION

The present invention provides a simple, reliable and versatile two-way pre-bite tension adjustment fishing line release and fish bite alarm apparatus. The apparatus of the present invention is for use in combination with a fishing reel carrying fishing line and a fishing lure or bait.

The two-way pre-bite tension adjustment fishing line release and fish bite alarm apparatus of present invention includes a non-electrically conductive body having a battery housed in the body together with an electrically energized auditory-visual alarm. A non-electrically conductive two-way pre-bite fishing line tensioning mechanism is provided, and includes, a rotatable tensioning screw mounted in rotatable engagement with the body proximate the top thereof. A thin flat elongated truncated U-shaped tensioning lever-alarm activation member is rotatably mounted proximate the bottom of the U-shaped member to the tensioning screw. A thin flat battery cover is mounted on top of the body directly under and in flush contact with the U-shaped tensioning lever-alarm activation member. The thin flat truncated U-shaped tensioning lever-alarm activation member includes an elongated fishing line contact portion on the longer side thereof of predetermined length and shape. The thin flat truncated U-shaped lever alarm member further includes an alarm disabling wing portion on the other side thereof. The fishing line, when the apparatus is properly set for sensing a fish biting the bait, is clamped between the battery cover and the elongated fishing line contact portion of the lever-alarm activation member at a predetermined distance from the tensioning screw.

The apparatus of the present invention also includes an electrical switch member including first and second metallic thin flat resilient electrically conductive strips. The second metallic thin flat resilient conductive strip is connected in circuit with one terminal of the battery. The first metallic thin flat resilient conductive strip is connected in circuit at one end thereof with the electrically energized auditory-visual alarm. The other end of the first flat conductive strip extends above the top of the body and the first flat electrically conductive strip is movable between an electrically energized position and a non-electrically energized position. The alarm disabling wing portion of the lever-alarm activation member, when the fishing line is in the clamped position, is in mechanical contact with the other end of the first metallic thin flat conductive strip to force the first resilient conductive strip to a non-electrically energized position.

Preferably, the thin flat truncated U-shaped tensioning lever-alarm activation member has a tensioning screw pivot aperture passing there through in predetermined position near the bottom of the lever-alarm activation member. Desirably the elongated fishing line contact portion of the thin flat truncated U-shaped lever-alarm activation member is tapered and has a rectangular cross-section. Preferably, the elongated fishing line contact portion has a fishing line guide slot of predetermined dimensions forming a forward clamping arm and a rearward clamping arm. Desirably, the rearward clamping arm is transversely resilient to permit the width of the guide slot to reduce causing the forward clamping arm and the rearward clamping arm to instantaneously add an additional pinch to the fishing line when the line is in a predetermined position upon a fish striking the line.

Preferably, the non-electrically conductive body has a central horizontal pocket in the back thereof of predetermined size and shape. The non-electrically conductive body has right and left side vertical apertures passing through it between the top and bottom thereof on opposite sides of the horizontal central pocket. The non-electrically conductive body also has advantageously a vertical cylindrical pocket positioned between the right and left side vertical apertures. The non-electrically conductive body also has a first vertical slot passing between the central horizontal pocket and the vertical cylindrical pocket near the back of the body. The non-electrically conductive body is desirably also has a second vertical slot at the back of the body passing between the top and the bottom of the body.

The electrically energized auditory-visual alarm of the present invention includes a piezoelectric device preferably carried within the central horizontal pocket of the body. The second thin flat metallic electrically conductive strip at one end is connected in circuit with the piezoelectric device. The second conductive strip desirably passes through the first vertical slot of the body. The second conductive strip advantageously has a perpendicular corner proximate the other end thereof. The other end of the second conductive strip extends beyond the perpendicular corner and is positioned at the bottom of the vertical cylindrical pocket of the body in substantial parallel relationship with the bottom. Preferably, the battery is disc shaped and carried within the vertical cylindrical pocket of the body and is connected in circuit with the first metallic strip when it is in operative position. The first metallic thin flat resilient electrically conductive strip is preferably attached at one end to the back plate and the first conductive strip is in circuit with the piezoelectric device. Advantageously, the auditory-visual alarm also includes a light emitting diode mounted on the back plate, the piezoelectric device and the light emitting diode are connected in parallel circuit arrangement.

The right and left side vertical apertures are desirably threaded. The tensioning screw when in operative position engages the body proximate the top of the right side vertical aperture. A battery cover screw preferably engages the body near the top of the left side vertical aperture. Desirably, the batter cover has a tensioning screw aperture passing through the right side thereof and the first tensioning screw operatively engages the battery cover. The battery cover also preferably has a second slot therein near the left side thereof. The battery cover screw passes through the second slot and operatively engages the battery cover. Preferably, the tensioning screw has a clockwise thread.

A base clamp member is preferably provided, which is detachably affixed to the bottom of the body.

BRIEF DESCRIPTION OF THE DRAWINGS

For a better understanding of the invention, reference may be had to the preferred embodiment, exemplary of the invention, shown in the accompanying drawings in which:

FIG. 8 is an exploded sectional isometric view of the fishing line release and bite alarm apparatus of the present invention taken along the line 8-8 of FIG. 7;

FIG. 9A is a partially schematic side elevation view of the alarm portion of the apparatus in the pre-bite position;

FIG. 9B is the same schematic view as shown in FIG. 9A but the alarm portion of the apparatus is shown in position after a fish bites and releases the fishing line;

BRIEF DESCRIPTION OF THE PREFERRED EMBODIMENT

Figure 1:
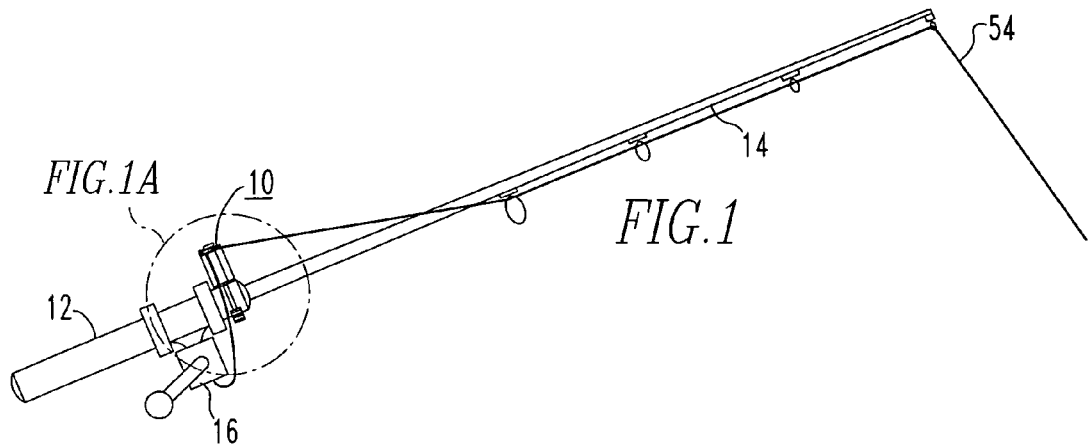
FIG. 1 is a side elevation view showing the fishing line release and fish bite alarm apparatus of the present invention in a typical mounting arrangement on a fishing rod.
Figure 1A:
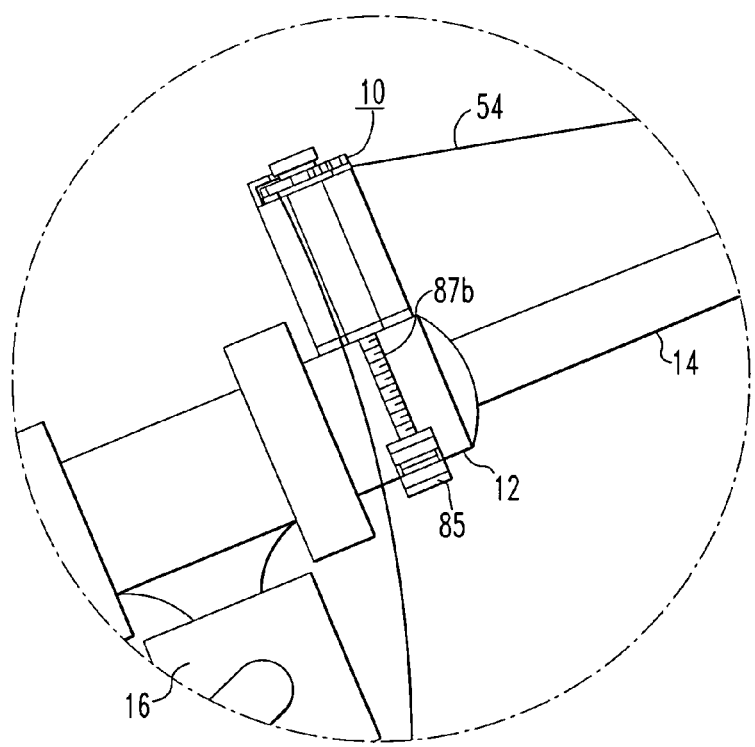
FIG. 1A is an enlarged side elevation view of the area enclosed by the dashed lines in FIG. 1.
Figure 2:
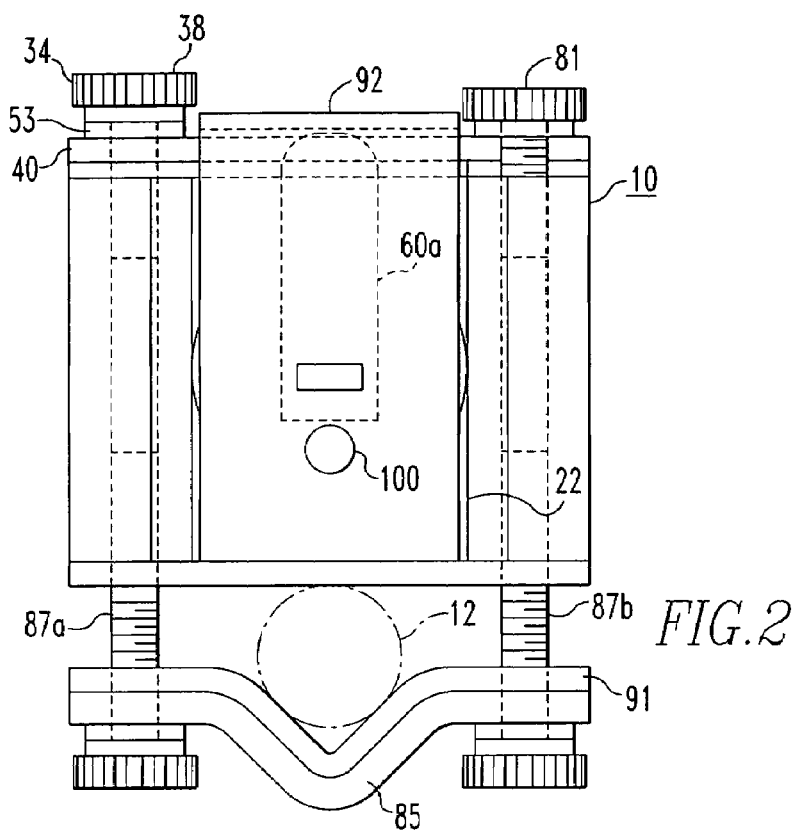
FIG. 2 is a rear elevation view of the fishing line release and fish bite alarm apparatus of the present invention.
Figure 3:
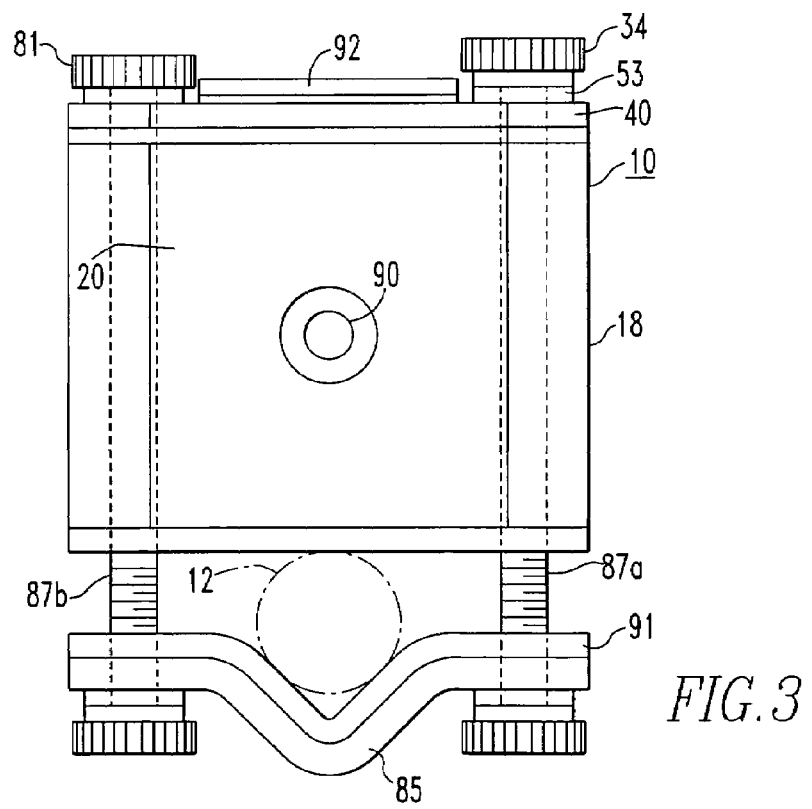
FIG. 3 is a front elevation view of the fishing line release and fish bite alarm apparatus of the present invention.

With reference to FIGS. 1-7 there is shown a two-way pre-bite tension adjustment fishing line release and bite alarm apparatus 10 of the present invention. The apparatus 10 is usable with virtually any type of fishing reel and may be mounted on a fishing rod or, for example, on a handle of a spring clamp, not shown, which may be attached to a gunnel of a boat. In FIGS. 1 and 1A the fishing line release and bite alarm apparatus 10 is shown mounted on the handle 12 of a fishing rod 14. It is preferable to mount the apparatus 10 on the handle proximate the balance point of the rod 14 in front of the fishing reel 16. This mounting arrangement permits the apparatus 10 to function without degrading the flexibility of the rod 14. The reel 16 shown in FIG. 1 is a spinning type reel, but any type of fishing reel may be utilized. In order for the apparatus 10 to function properly the reel 16 must first be set to the free spool position.

The two-way pre-bite tension adjustment fishing line release and fish bite alarm apparatus 10 of the present invention, with reference to FIGS. 2-8 and 12 includes a non-electrically conductive body 18. The body 18 has a front 20, a back 22, a top 24 and a bottom 26. The body 18 is made of a non-electrically conductive material. A material for the body 18 such as industrial grade polyvinyl chloride, i.e., PVC has been found to work well, of course any non-conductive material with the requisite rigidity may be used. A battery 28 is housed within the body 18 as shown in FIGS. 4A-9B, for example. The battery as shown in FIGS. 4A-9B is a common widely available thin disc shaped battery, which may be a 3 volt battery typically designated by the numerals "2032" and has a diameter of about 20 mm. An electrically energized auditory-visual alarm 30 is connected in circuit with the battery 28 as shown schematically in FIG. 12 upon a fish biting the line.

Figure 4A:
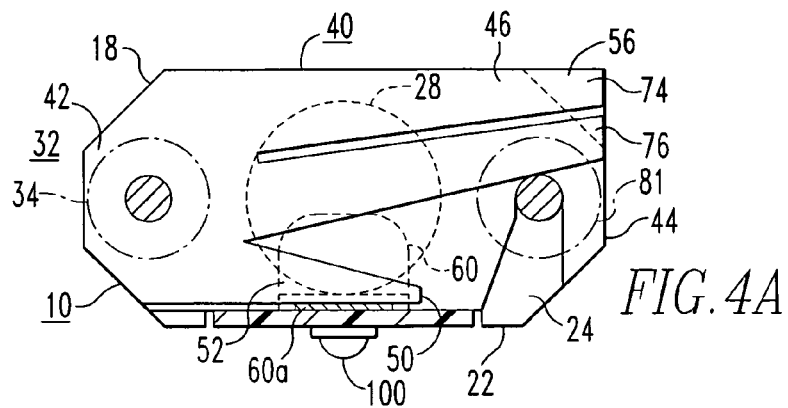
FIG. 4A is a top view of the fishing line release and fish bite alarm apparatus in the pre-bite position.
Figure 4B:
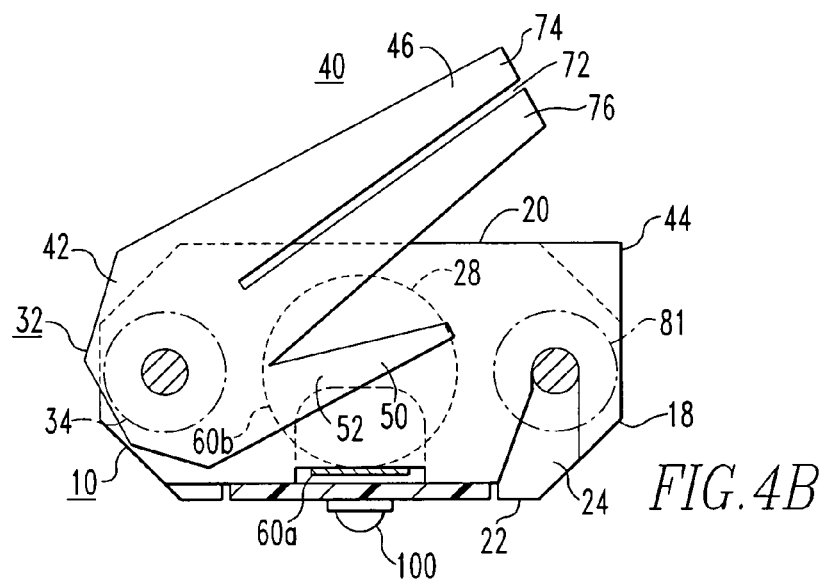
FIG. 4B is the same view as FIG. 4A but in the position after a fish bites with the fishing line released and the alarm energized.
Figure 6:
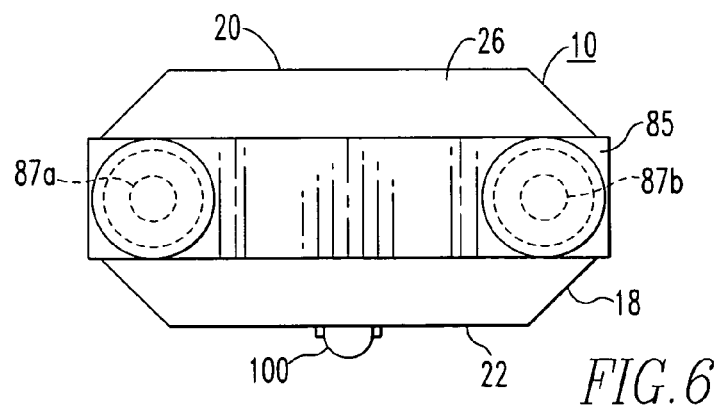
FIG. 6 is a bottom view of the fishing line release and fish bite alarm apparatus of the present invention.
Figure 7:
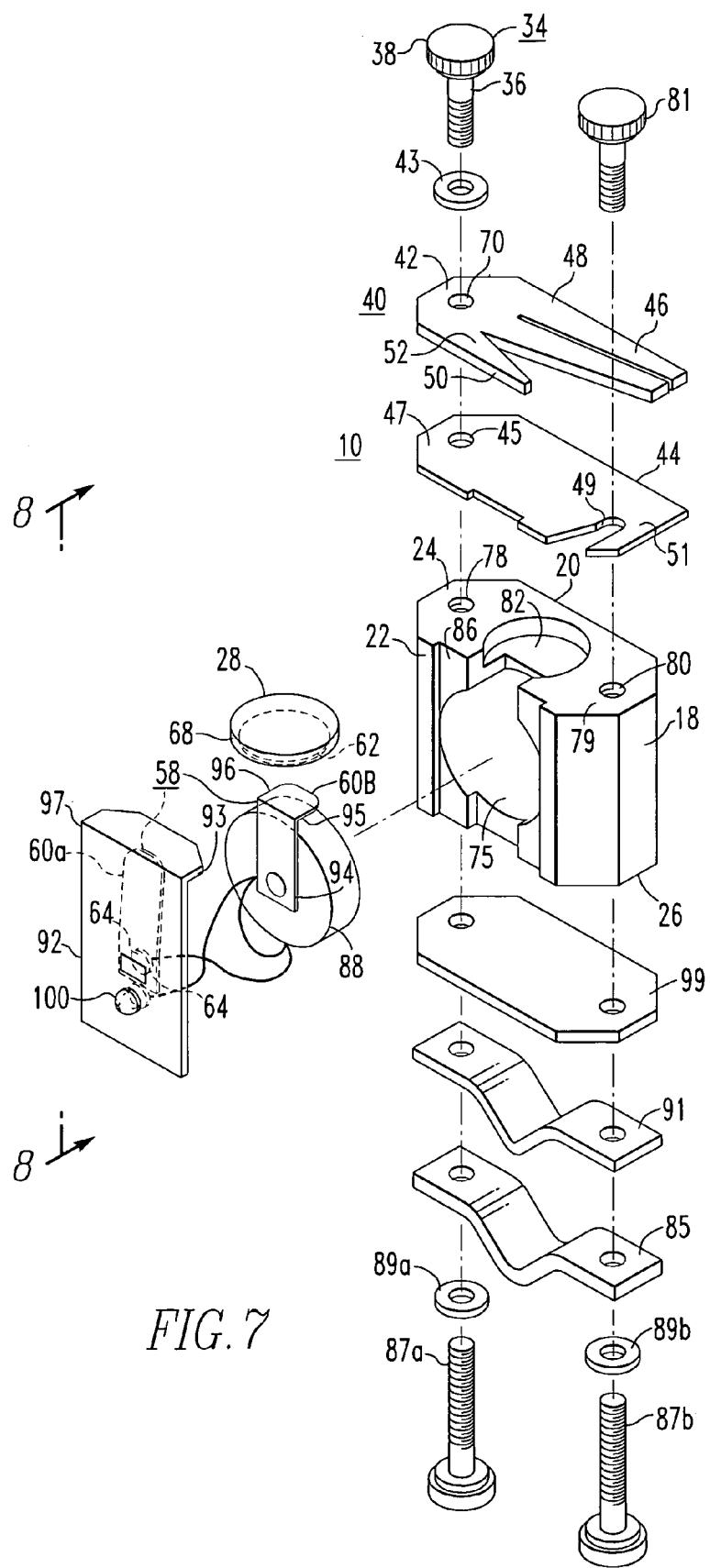
FIG. 7 is an exploded isometric view of the fishing line release and fish bite alarm apparatus of the present invention.
Figure 10:
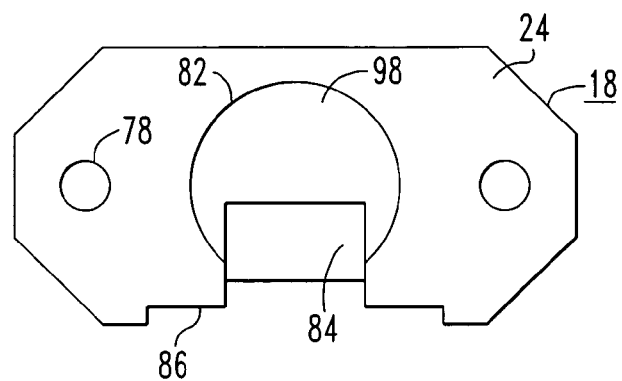
FIG. 10 is a top view of the non-electrically conductive body of the present invention.
Figure 11:
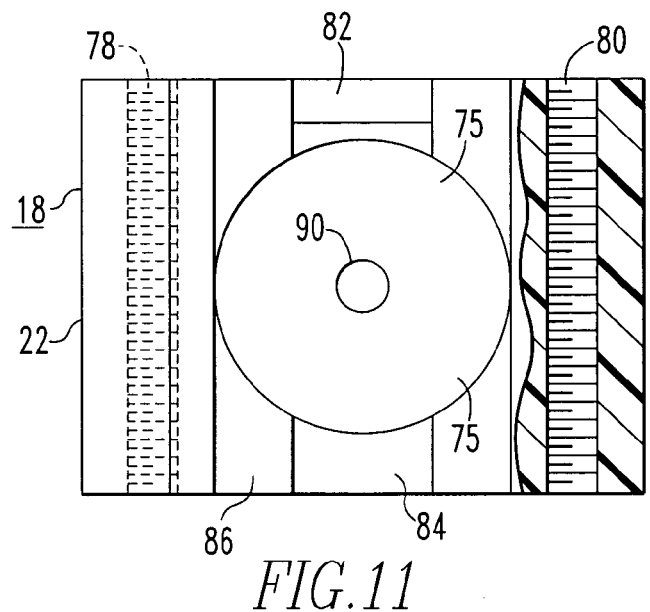
FIG. 11 is a rear elevation view of the body shown in FIG. 10.

A non-electrically conductive two-way pre-bite fishing line tension mechanism 32 which includes a rotatable tensioning screw 34 as shown in FIGS. 4A, 4B and 7, for example. The tensioning screw 34 is preferably made with a stainless steel shaft 36 and a plastic head 38 with fluting for firmer grasping. The tensioning screw 34 is mounted in rotatable engagement with the body 18 proximate the top 24 thereof. The tensioning mechanism 32 also includes a thin elongated flat truncated U-shaped tensioning lever-alarm activation member 40 rotatably mounted proximate the bottom 42 thereof to the tensioning screw 34. The lever-alarm activation member 40 is non-electrically conductive, and may be made of industrial grade polyvinyl chloride, for example. The fishing line tensioning mechanism 32 also includes a thin flat non-conductive battery cover 44 mounted on the top 24 of the body 18, as shown in FIGS. 4A-8, directly under and in flush contact with the U-shaped tensioning lever-alarm activation member 40. The thin flat truncated U-shaped tensioning lever-alarm activation member includes an elongated fishing line contact portion 46 on the longer side 48 thereof, having a length preferably as least as long as the width of the body 18, and a shape as shown in FIG. 8, for example. The thin flat truncated U-shaped lever-alarm activation member 40 includes an alarm disabling wing portion 50 on the shorter side 52. The lever-alarm activation member 40 maybe made of a polycarbonate resin sheet material such as manufactured and by the General Electric Company under the trademark "LEXAN".

The fishing line 54 is clamped as shown in FIG. 4A when the tensioning mechanism 32 is in the operative pre-bite position with the line 54 firmly clamped between the battery cover 44 and the elongated fishing line contact portion 46 of the lever-alarm activation member 40. The tensioning on the line may be varied in two ways. The first way is by tightening or loosening the tensioning screw 34 with respect to the body 18. The second way is by placing the fish line further away or closer to the tensioning screw 34 on the elongated fishing line contact portion 46 of the lever-alarm activation member 40, thereby increasing or decreasing the resultant moment arm and reducing or increasing the required force necessary for a fish on the end of the line 54 to exert to result in turning the screw 34 in a direction to reduce the tension on the line 54. Thus, the two-way pre-bite tensioning mechanism 32 uses the application of leverage combined with the force of the frictional tensioning screw 34 to provide any sensitivity desired to trip the alarm 30. For example, tensioning screw 34 may be tightened as desired into body 18 and the tension on fishing line 54 may be finely adjusted by moving the line 54 along the fishing line contact portion 46 either toward the tensioning screw 34 or away from the tensioning screw 34 towards the tip 56 of the contact portion 46 until the precise tension desired for the line 54 is achieved. The lever-alarm activation member 40 acts as a clamp in the pre-strike position to prevent fishing line 54 slippage by holding the line 54 in a series of 90 degree bends, as shown for example in FIG. 5B.

The apparatus 10 also includes an electrical switch member 58 including first and second metallic thin flat resilient conductive strips 60a, 60b, which may be brass strips, as shown in FIGS. 7 and 8, for example. The second conductive strip 60b is connected in circuit with one terminal 62 of battery 28. The first conductive strip 60a is connected in circuit at one end 64 with the auditory-visual alarm. The other end 66 of the first conductive strip 60a extends above the top 24 of the body 18 and is moveable between an electrically conductive position, as shown in FIG. 9B and a non-electrically conductive pre-strike position, as shown in FIG. 9A and functions together with the lever-alarm activation member 40 as an on-off switch. The alarm disabling portion 50 of the lever-alarm activation member 40 pushes the other end 66 of the first metallic strip 60a away from the battery 28 as can be seen in FIG. 9A to de-energize a normally closed circuit.

The fishing line release and bite alarm apparatus 10 of the present invention functions as follows: when a fish pulls on the fishing line 54, when the apparatus 10 is in the operative pre-bite position, as shown in FIG. 4A, for example, with sufficient force to overcome the clamping force on the lever-alarm activation member 40 as exerted by the tensioning screw 34 as varied by the moment arm resulting from the distance the fishing line had been placed from the tensioning screw on the elongated fishing line contact portion 46 of the lever-alarm activation member 40, the tensioning screw 34, upon the fish striking the line will turn in a predetermined direction lowering the required tension to move the U-shaped lever-alarm member 40, thereby allowing the fishing line to smoothly go from a clamped state to free spool, and the alarm disabling portion 50 of the lever-alarm activation member will release the other end 66 of the first metallic conductive strip 60a, thereby permitting the first conductive strip 60a to contact the other terminal 68 of battery 28 and energize the auditory-visual alarm 30.

Figure 5A:
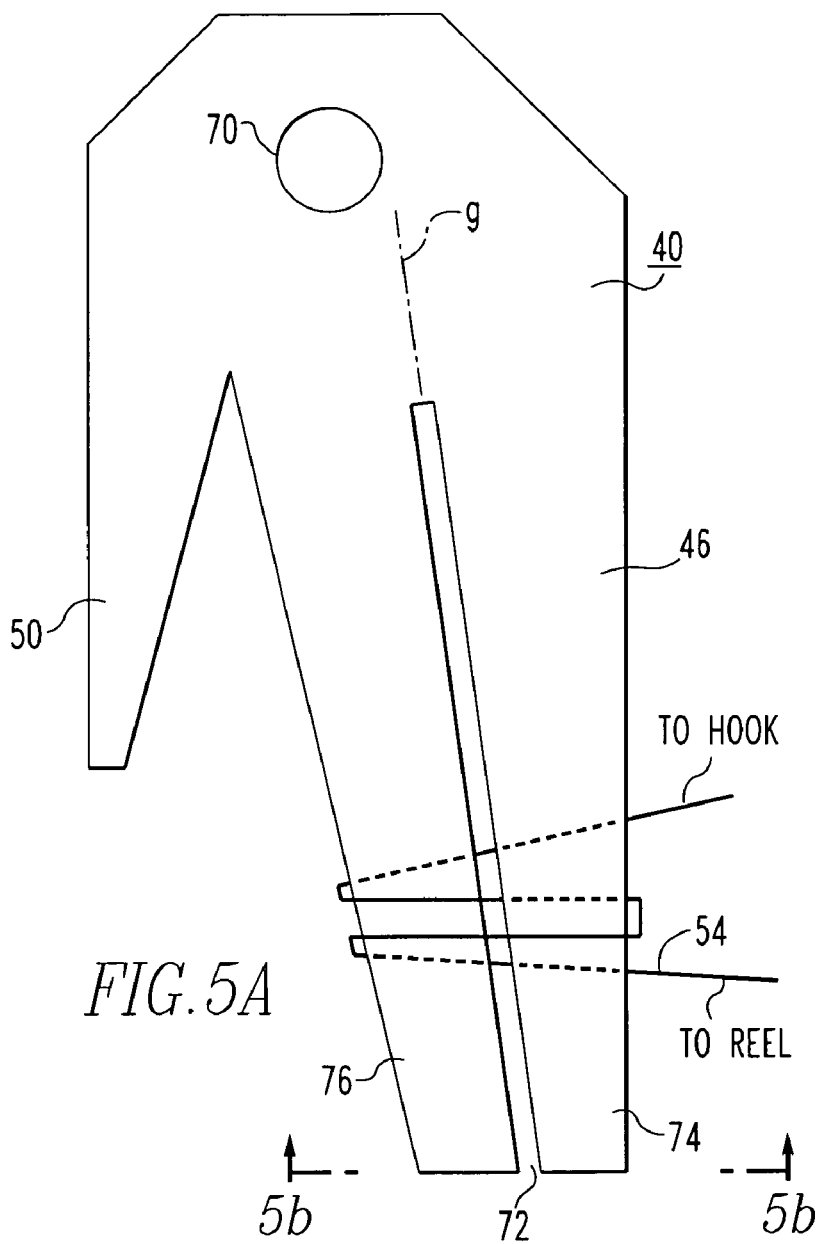
FIG. 5A is a schematic top view showing the fishing line engaging the tensioning lever-alarm activation member.
Figure 5B:
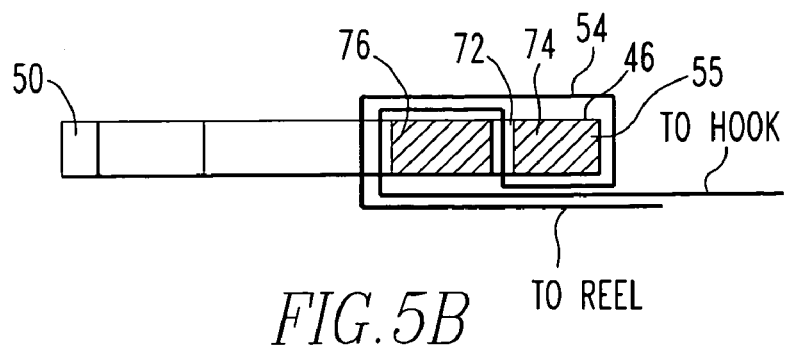
FIG. 5B is a schematic side view showing the fishing line engaging the tensioning lever-alarm activation member with a cross-section taken along line 5*b*-5*b* of FIG. 5A.

The thin flat truncated U-shaped tensioning lever-alarm activation member 40 preferably has a tensioning screw pivot aperture 70 passing through it in predetermined position near the bottom 42 thereof, as shown in FIGS. 7 and 8. The elongated fishing line contact portion 46 of the lever-alarm activation member 40 is preferably tapered for optimal performance as shown in FIG. 4A, for example, and has a rectangular cross-section 55, as shown in FIG. 5B. The elongated fishing line contact portion has a fishing line guide slot 72 of predetermined dimensions such as 0.060 inches wide and 1.375 inches long, thereby forming a forward clamping arm 74 and a rearward clamping arm 76, as shown in FIGS. 4A and 4B. Preferably, the rearward clamping arm 76 is transversely resilient, whereby the width of the guide slot 72 reduces, causing the forward clamping arm 74 and the rearward clamping arm 76 to instantaneously touch to add support to rearward clamping arm 76 when the fishing line 54 is in a predetermined operative position near the opening of slot 72 upon a fish taking the line to prevent any chance of rearward clamping arm 76 breaking when the line is in such position. The fishing line 54 in the pre-bite position is wrapped around the forward clamping arm 74 and the rearward clamping arm 76, as shown in FIGS. 5A and 5B, resulting in the series of 90 degree bends for the fishing line 54, as previously mentioned, to result in the line 54 being firmly clamped between the tensioning lever-alarm activation member and the battery cover 44. Preferably, the guide slot 72 is in predetermined alignment with the tensioning pivot screw aperture 70. It has been found that the slot 72 is preferably positioned on a line "g" as shown in FIG. 5A, offset from the center of the tensioning screw pivot aperture 70 which allows the fishing line 54 to be placed any distance, permitted by slot 72, from the pivot aperture 70 and tensioning screw 34, to provide the ability to vary the leverage exerted by the lever-alarm activation member 40 as desired.

The non-electrically conductive body 18 preferably has a central horizontal pocket 75 in the back 22 of size and shape to house the piezoelectric device 88. The non-electrically conductive body 18 also preferably has a right side vertical aperture 78 and a left side vertical aperture 80 passing through the body 18 between the top 24 and the bottom 26. The right side vertical aperture 78 and the left side vertical aperture 80 are desirably disposed on opposite sides of the horizontal central pocket 75. The body 18 proximate the right side vertical aperture 78 and the left side vertical aperture 80 is provided with a clockwise thread, which may be a standard 8/32 of an inch thread. The tensioning screw 34 when in operative position engages the body 18 near the top of the right side vertical aperture 78. Preferably the tensioning screw 34 is also provided with a right hand or clockwise thread. The tensioning screw 34 may be made of stainless steel with a plastic knurled head, for example. A battery cover screw 81 engages the body 18 near the top 79 of the left side vertical aperture 80. The battery cover screw 81 is made similarly to that described for the tensioning screw 34. Preferably the battery cover 44 is provided with a battery cover tensioning screw aperture 45 passing through the right side 47 thereof. The tensioning screw 34 desirably, as mentioned, has a clockwise thread, which permits the tensioning screw 34 to rotate in a counter clockwise direction as a fish pulls on the line 54 to smoothly reduce the tension as it is backed out of the threaded aperture 78. The tensioning screw 34 rotates as lever-alarm activation member 40 rotates on release of line 54 and decreases the frictional force holding line 54 permitting a smooth release. The tensioning screw 34 operatively engages the battery cover 44. The tensioning screw 34 desirably passes through a tensioning screw washer 43 made of a material such as rubber or nylon, as shown in FIG. 7. The battery cover 44 is also has a second slot 49 near the left side 51. The battery cover screw 81 operatively engages the battery cover. The battery cover 44 is non-conductive and may be made of rigid plastic such as polyvinyl chloride or acrylic, for example. Also the body 18 advantageously has a vertical cylindrical pocket 82 therein and which is sized to hold the battery 28. The battery 28 may easily be replaced by unscrewing screws 34, 81 slightly and swinging the battery cover 44 out of the way. The vertical pocket 82 is positioned between the right vertical aperture 78 and the left vertical aperture 80 and above the central horizontal pocket 75 of the body 18. The body 18 also desirably has a first vertical slot 84 therein passing between the central horizontal pocket 75 and the vertical cylindrical pocket 82 near the back 22 of the body 18. The body 18 also preferably has a second vertical slot 86 therein near the back 22 of the body 18 passing between the top 24 and the bottom 26.

Preferably the apparatus 10 includes a base clamp member 85 which may be attached to the body 18 by base clamp screws 87a, 87b passing through rubber washers 89a, 89b, first foam pad 91 and second foam pad 99 and respectively engaging threaded apertures 78, 80 of body 18. The foam pads 91, 92 are used to protect a rod handle if used in that manner. The screws 87a, 87b are preferably long enough to accommodate almost any rod handle diameter.

The auditory visual alarm 30 may include a piezoelectric device or buzzer 88 carried within the central horizontal pocket 75 of the body 18 and that emits a shrill piercing sound upon a fish taking the bait. The body 18 has a sound transmitting aperture 90 passing there through in the front 20 thereof. Such a piezoelectric buzzer 88 is available at Radio Shack as part no. 273-059.

The first metallic thin flat resilient conductive strip 60a is of predetermined dimensions such as 0.008 inches thick and 0.25 inches wide and 1.25 inches long and is attached at one end 64 to a non-conductive back plate 92. The back plate 92 may be made of polyvinyl chloride for example, and is provided with a lip 93 at the upper end 97 thereof to protect the exposed other end 66 of conductive strip 60a which extends above the battery cover 44. The first conductive strip 60a is preferably made of brass and is connected in circuit with the piezoelectric device 88 as shown, for example, in FIGS. 7 and 8. The battery 28 is preferably housed within the vertical cylindrical pocket 82 of the body 18.

The second conductive strip 60b is of predetermined dimensions such as 0.008 inches and 0.25 inches wide and 1.25 inches long and is attached at one end 94 to the piezoelectric device 88, as shown in FIGS. 7 and 8. The second conductive strip 60b is connected in circuit with the piezoelectric device 88. The second conductive strip 60b in operative position passes through the first vertical slot 84 of the body 18. The second conductive strip 60b has a perpendicular corner 95 near the other end 96. The other end 96 of the second conductive strip 60b beyond the perpendicular corner 95 is positioned at the bottom 98 of the vertical cylindrical pocket 82 and in substantial parallel relationship therewith, shown schematically in FIGS. 9A and 9B.

Figure 12:
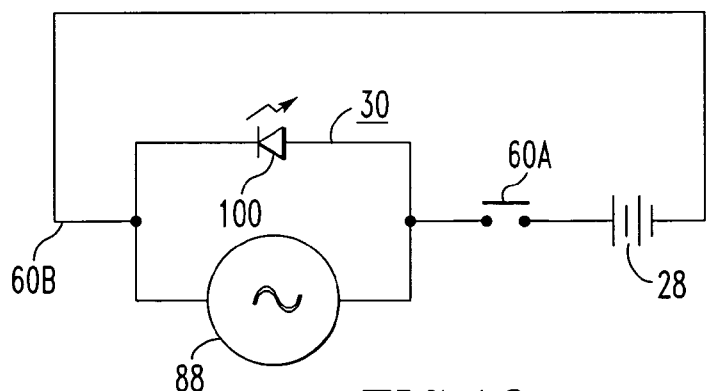
FIG. 12 is an electrical schematic showing the circuit arrangement of the present invention.

The auditory-visual alarm 30 of the present invention advantageously includes a light emitting diode 100 mounted on the back plate 92 connected in parallel circuit arrangement with the piezoelectric buzzer 88 as shown in FIG. 12. The light emitting diode may be of the type sold at Radio Shack as part no. 276-036 in the red light version and part no. 276-022 in the green light version. Upon a fish biting the bait, the alarm 30 will be energized by the alarm disabling wing portion 50 of the tensioning lever alarm activation member 40 releasing the other end 66 of the first conductive strip 60a which is biased to normally contact positive terminal 102 of the battery 28. With the disc shaped battery 28 the positive terminal 102 extends around the rim 104 of the battery 28. When first conductive strip 60a touches the rim 104 of the battery 28 the light emitting diode 100 emits light and the piezoelectric device 88 emits sound signaling to the fisherman that the apparatus 10 has sensed a fish bite. With the release of the fishing line as mentioned before the reel is in the free spool position, which allows the fish to run virtually unimpeded with the bait until it is felt that the fish has had time to swallow or bite hard on the bait. Very often fish swimming in schools will attempt to carry the bait away softly in their mouths to get away from the other fish before they will actually swallow or bite hard on the bait. If an attempt is made to early to set the hooks very often this results in losing the fish. The present invention allows the fisherman to set the tension on the line 54 in virtually an infinite manner to adjust for currents and other external conditions. Also as previously mentioned the apparatus 10 does not have to be mounted on a reel but may be mounted to a boat, dock, etc.

Although the present invention has been described with reference to the preferred embodiments, one skilled in the art will know that changes may be made in form and detail of the preferred embodiments without departing from the spirit and scope of the invention as set forth in the claims.

What is claimed is:

1. A two-way pre-bite tension adjustment fishing line release and fish bite alarm apparatus in combination with a fishing reel carrying a fishing line, said two-way pre-bite tension adjustment fishing line release and fish bite alarm apparatus comprising:

(a) a non-electrically conductive body having a front, a back, a top and a bottom;

(b) a battery housed within said body;

(c) an electrically energized auditory-visual alarm connected in circuit with said battery;

(d) a non-electrically conductive two-way pre-bite fishing line tensioning mechanism; said two-way pre-bite fishing line tensioning mechanism including a rotatable tensioning screw mounted in rotatable engagement with said body proximate the top thereof, a thin elongated flat truncated U-shaped non-conductive tensioning lever-alarm activation member rotatably mounted to said tensioning screw, a thin flat non-conductive battery cover mounted on said top of said body directly under and in flush contact with said U-shaped tensioning lever-alarm activation member, said thin flat truncated U-shaped non-conductive tensioning lever-alarm activation member including an elongated fishing line contact portion of predetermined length and shape, and said thin flat truncated U-shaped lever-alarm activation member further including an alarm disabling wing portion, said fishing line being in a clamped position when in operative prebite position between said battery cover and said elongated fishing line contact portion of said lever-alarm activation member at a predetermined distance from said tensioning screw,
  (e) an electrical switch member including first and second metallic thin flat resilient electrically conductive strips, said second metallic thin flat resilient conductive strip in electrical circuit with one terminal of said battery, said first metallic thin flat resilient conductive strip connected in circuit at one end thereof with said electrically energized auditory-visual alarm, the other end of said first flat conductive strip extending above the top of said body and the other end of said first flat conductive strip moveable between an electrically conductive position in electrical contact with the other terminal of said battery and a non-electrically conductive position, said alarm disabling portion of said lever-alarm activation member, when said fishing line is in said clamped position, being in mechanical contact with said other end of said first metallic thin flat conductive strip to force said first resilient strip to the non-electrically conductive position,
whereby upon a fish pulling on said fishing line, when in said operative pre-bite position, with a force sufficient to overcome the clamping force placed on said lever-alarm activation member by said tensioning screw as varied by a moment arm resulting from a distance said fishing line may be placed from said rotatable tensioning screw on said elongated fishing line contact portion of said thin flat U-shaped tensioning lever-alarm activation member, said tensioning screw, upon a fish biting said fishing line, will turn in a predetermined direction lowering a required tension to move said U-shaped tensioning lever-alarm activation member thereby allowing said fishing line to smoothly go from a clamped state to free spool, and said alarm disabling wing portion will release said first flat resilient conductive strip, thereby permitting said first conductive strip to contact the other terminal of said battery and energize said auditory-visual alarm in the electrically conductive position.

2. The apparatus of claim 1, wherein said thin flat truncated U-shaped tensioning lever-alarm activation member has a tensioning screw pivot aperture passing there through in predetermined position proximate a bottom thereof.

3. The apparatus of claim 2, wherein said elongated fishing line contact portion of said thin flat truncated U-shaped lever-alarm activation member is tapered.

4. The apparatus of claim 3, wherein said elongated fishing line contact portion has a rectangular cross-section.

5. The apparatus of claim 4, wherein said elongated fishing line contact portion has a fishing line guide slot of predetermined dimensions therein forming a forward clamping arm and a rearward clamping arm.

6. The apparatus of claim 5, wherein said fishing line guide slot of said fishing line contact portion is in predetermined alignment with said tensioning screw pivot aperture of said lever-alarm activation member.

7. The apparatus of claim 6, wherein said rearward clamping arm is transversely resilient, whereby a width of said guide slot reduces upon a fish taking said line causing said forward clamping arm and said rearward clamping arm to instantaneously touch to add support for said reward clamping arm when said fishing line is in predetermined operative position upon a fish taking said fishing line.

8. The apparatus of claim 1, wherein said non-electrically conductive body has a central horizontal pocket in the back thereof of predetermined size and shape.

9. The apparatus of claim 8, wherein said non-electrically conductive body has a right side vertical aperture and a left side vertical aperture passing through said body between said top and said bottom thereof, said right side vertical aperture and said left side vertical aperture disposed on opposite sides of said horizontal central pocket.

10. The apparatus of claim 9, wherein said non-electrically conductive body has a vertical cylindrical pocket therein of predetermined dimensions, said vertical pocket located between said right side vertical aperture and said left side vertical aperture and above said central horizontal pocket of said body.

11. The apparatus of claim 10, wherein said non-electrically conductive body has a first vertical slot therein passing between said central horizontal pocket and said vertical cylindrical pocket proximate the back of said body.

12. The apparatus of claim 11, wherein said non-electrically conductive body has a second vertical slot therein proximate the back of said body passing between said top and said bottom of said body.

13. The apparatus of claim 12, wherein said electrically energized auditory-visual alarm is a piezoelectric device carried within said central horizontal pocket of said body.

14. The apparatus of claim 13, wherein said first thin flat metallic electrically conductive strip is of predetermined dimensions and is connected in circuit with said piezoelectric device.

15. The apparatus of claim 14, wherein said battery is disc shaped and carried within said vertical cylindrical pocket of said body and in circuit with said first metallic strip when in operative position.

16. The apparatus of claim 15, wherein said first metallic thin flat resilient electrically conductive strip is of predetermined dimensions and affixed at said one end thereof to a back plate, said second conductive strip in circuit with said piezoelectric device, said first metallic strip passing through said first vertical slot of said body, said second conductive strip having a perpendicular corner proximate the other end thereof, and the other end of said second conductive strip beyond said perpendicular corner positioned proximate a bottom of said vertical cylindrical pocket of said body and in substantial parallel relationship therewith.

17. The apparatus of claim 16, wherein said electrically energized auditory-visual alarm further includes a light emitting diode mounted on said back plate, said piezoelectric device and said light emitting diode connected in parallel circuit arrangement.

18. The apparatus of claim 17, wherein said body proximate said right side vertical aperture and said left side vertical aperture is threaded.

19. The apparatus of claim 18, wherein said tensioning screw when in operative position engages said body proximate a top of said right side vertical aperture.

20. The apparatus of claim 19, further comprising a battery cover screw engaging said body proximate a top of said left side vertical aperture.

21. The apparatus of claim 20, wherein said battery cover has a tensioning screw aperture passing through a right side thereof, said tensioning screw operatively engaging said battery cover.

22. The apparatus of claim 21, wherein said battery cover has a slot therein proximate a left side thereof, said battery cover screw passing through said slot and operatively engaging said battery cover.

23. The apparatus of claim 22, further comprising a base clamp member detachably affixed to said bottom of said body.

24. The apparatus of claim 23, wherein said rotatable tensioning screw and said body proximate said tensioning screw aperture have a clockwise thread.

* * * * *